(12) United States Patent
Kumazaki

(10) Patent No.: US 10,730,477 B2
(45) Date of Patent: Aug. 4, 2020

(54) VEHICLE CONTROL SYSTEM, AND CONTROL METHOD OF VEHICLE CONTROL SYSTEM

(71) Applicant: TOYOTA JIDOSHA KABUSHIKI KAISHA, Toyota-shi, Aichi-ken (JP)

(72) Inventor: Kenta Kumazaki, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/004,703

(22) Filed: Jun. 11, 2018

(65) Prior Publication Data

US 2019/0039565 A1 Feb. 7, 2019

(30) Foreign Application Priority Data

Aug. 1, 2017 (JP) ................................ 2017-149456

(51) Int. Cl.
    *B60W 20/15* (2016.01)
    *B60R 25/045* (2013.01)
    *B60R 25/24* (2013.01)
    *B60R 25/04* (2013.01)

(52) U.S. Cl.
    CPC .......... *B60R 25/045* (2013.01); *B60R 25/241* (2013.01); *B60W 20/15* (2016.01); *B60R 2025/0415* (2013.01); *B60R 2325/103* (2013.01); *B60W 2540/043* (2020.02);
    (Continued)

(58) Field of Classification Search
    CPC ...... B60W 20/40; B60W 10/02; B60W 10/06; B60W 10/105; B60W 20/00; B60W 2560/04; B60W 2560/06; B60W 20/15; B60W 2540/28; B60W 2710/06; B60W 2710/08; B60R 25/045; B60R 25/241; B60R 2025/241; B60K 1/02; B60K 6/40; B60K 6/43; B60K 6/54; B60K 6/356;
    (Continued)

(56) References Cited

U.S. PATENT DOCUMENTS

| 6,030,316 | A | 2/2000 | Kadota |
| 10,101,738 | B2 * | 10/2018 | Kaspersky ........... G05D 1/0016 |
| 2002/0069009 | A1 | 6/2002 | Hellmann et al. |

(Continued)

FOREIGN PATENT DOCUMENTS

| DE | 102006042419 A1 | 3/2008 |
| DE | 102009019795 A1 | 11/2010 |

(Continued)

OTHER PUBLICATIONS

Jafarnejad et al., A Car Hacking Experiment: When Connectivity Meets Vulnerability, 2015, IEEE, p. 1-6 (Year: 2016).*

(Continued)

*Primary Examiner* — McDieunel Marc
(74) *Attorney, Agent, or Firm* — Oliff PLC

(57) ABSTRACT

An electronic control unit configured to permit a vehicle to travel in an automated driving mode. The electronic control unit is configured to detect unauthorized access from an outside to an in-vehicle Local Area Network during the automated driving mode. The electronic control unit is configured to perform control to fix a gear position of an automatic transmission when the electronic control unit determines that unauthorized access from the outside occurs during the automated driving mode.

7 Claims, 11 Drawing Sheets

(52) U.S. Cl.
CPC ..... *B60W 2710/06* (2013.01); *B60W 2710/08* (2013.01); *Y10S 903/93* (2013.01)

(58) Field of Classification Search
CPC ..... B60K 6/455; Y02T 10/56; Y02T 10/6221; Y02T 10/6239; Y02T 10/6286; F16H 2037/8073
See application file for complete search history.

(56) References Cited

U.S. PATENT DOCUMENTS

| | | | |
|---|---|---|---|
| 2005/0101437 A1 | 5/2005 | Wiethe et al. | |
| 2013/0145482 A1* | 6/2013 | Ricci | H04W 4/90 726/28 |
| 2013/0166131 A1 | 6/2013 | Shiiba et al. | |
| 2018/0066750 A1* | 3/2018 | Nishimine | F16H 61/0248 |
| 2018/0141540 A1* | 5/2018 | Kumazaki | B60W 10/04 |
| 2018/0164800 A1* | 6/2018 | Kaspersky | G05D 1/0016 |
| 2018/0337957 A1* | 11/2018 | Chen | H04L 63/205 |
| 2019/0018405 A1* | 1/2019 | Kaspersky | G05D 1/0016 |
| 2019/0039565 A1* | 2/2019 | Kumazaki | B60W 20/15 |
| 2019/0111933 A1* | 4/2019 | Schoeggl | B60W 40/09 |

FOREIGN PATENT DOCUMENTS

| | | |
|---|---|---|
| EP | 1 925487 A2 | 5/2008 |
| JP | H11-180182 A | 7/1999 |
| JP | 2000-127802 A | 5/2000 |
| JP | 2001-001787 A | 1/2001 |
| JP | 2001-334841 A | 12/2001 |
| JP | 2006-336717 A | 12/2006 |
| JP | 2008-128452 A | 6/2008 |
| JP | 4305498 B2 | 7/2009 |
| WO | 2012/032605 A1 | 3/2012 |
| WO | 2016/080452 A1 | 5/2016 |

OTHER PUBLICATIONS

Brandenburg et al., Switching from manual to automated driving and reverse: Are drivers behaving more risky after highly automated driving?, 2014, IEEE, p. 2978-2983 (Year: 2014).*
Kaustubh et al., The modeling of transfer of steering between automated vehicle and human driver using hybrid control frameworl 2016, IEEE, p. 808-814 (Year: 2016).*
Cabrall et al., Eye-based driver state monitor of distraction, drowsiness, and cognitive load for transitions of control in automated driving, 2016, IEEE, p. 1-2 (Year: 2016).*
Judalet et al., Incentive shared trajectory control for highly-automated driving, 2013, IEEE, p. 1089-1094 (Year: 2013).*
Jun. 28, 2019 Office Action issued in U.S. Appl. No. 15/800,581.
Nov. 15, 2019 Notice of Allowance issued in U.S. Appl. No. 15/800,581.
Jan. 14, 2020 Corrected Notice of Allowability issued in U.S. Appl. No. 15/800,581.
Dec. 5, 2019 Corrected Notice of Allowability issued in U.S. Appl. No. 15/800,581.

* cited by examiner

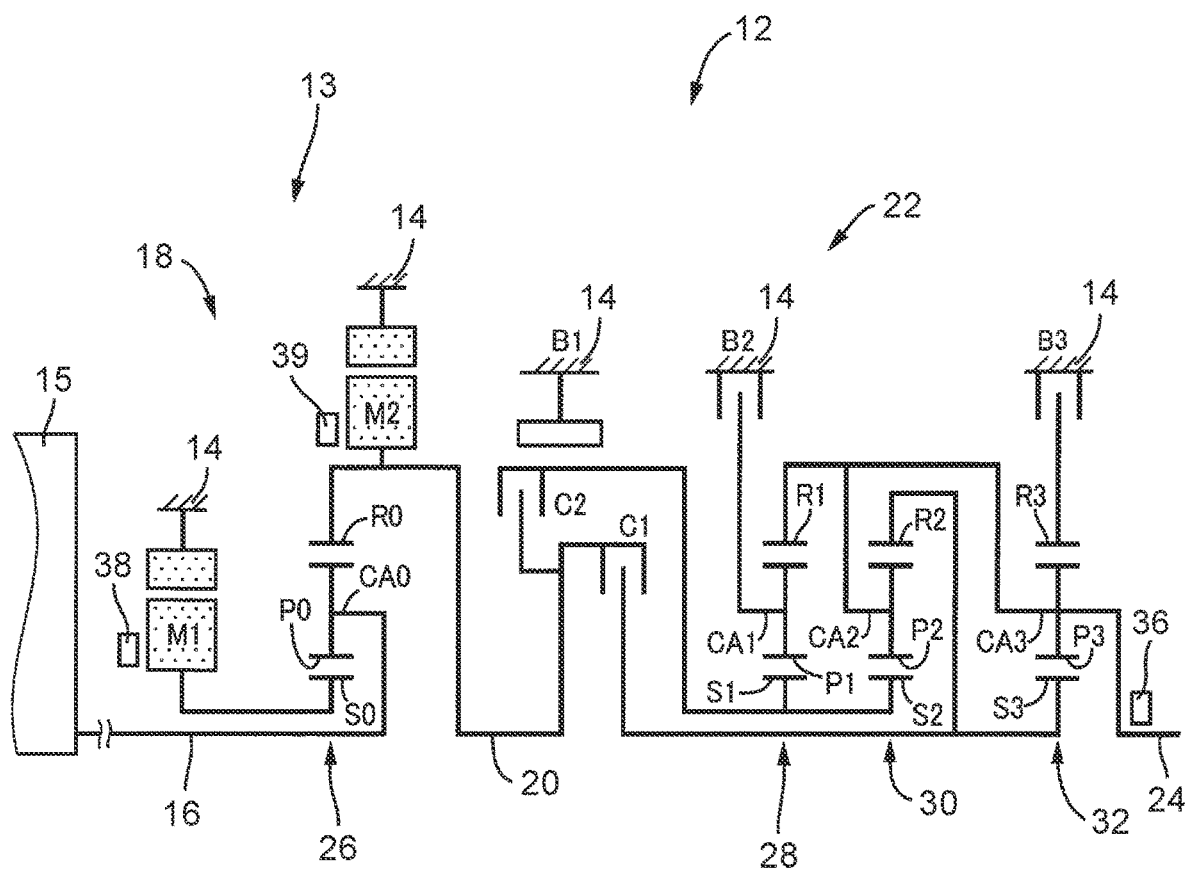

|  | C1 | C2 | C3 | C4 | B1 | B2 |
|---|---|---|---|---|---|---|
| P |  |  |  |  |  |  |
| Rev1 |  |  | ○ |  |  | ○ |
| Rev2 |  |  |  | ○ |  | ○ |
| N |  |  |  |  |  |  |
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |

○ : ENGAGED

VEHICLE CONTROL SYSTEM, AND CONTROL METHOD OF VEHICLE CONTROL SYSTEM

INCORPORATION BY REFERENCE

The disclosure of Japanese Patent Application No. 2017-149456 filed on Aug. 1, 2017 including the specification, drawings and abstract is incorporated herein by reference in its entirety.

BACKGROUND

1. Technical Field

The disclosure relates to a vehicle control system, and a control method of the vehicle control system, for use in the case where unauthorized access occurs to a vehicle-mounted LAN, in a vehicle that can travel in an automated driving mode, and includes a drive power source, automatic transmission, and a shift range switching device that performs switching of shift ranges based on operation of a shift operation device.

2. Description of Related Art

In a control system of a vehicle which performs automated driving control, when unauthorized access from the outside to a vehicle-mounted LAN occurs, inappropriate vehicle operation may be carried out, and some countermeasure needs to be taken. In WO 2016/080452 A1, for example, when it is determined that unauthorized access occurs to a vehicle, a signal received from communication means provided in the vehicle is once shut off, so that an influence on the control system of the vehicle is reduced.

SUMMARY

In the control system of the vehicle, it has not been studied how to control the shift gear position, when it is determined that unauthorized access from the outside occurs, during automated driving. Therefore, when unauthorized access is detected in the control system of the vehicle described in WO 2016/080452 A1, control that involves change of the gear position may be performed, for example, even after shut-off of the received signal from the communication means.

This disclosure prevents shift control from being manipulated through unauthorized access when it is determined that unauthorized access is detected.

A first aspect of the disclosure is concerned with a vehicle control system. The vehicle control system includes a drive power source, an automatic transmission, a shift range switching device configured to perform switching of shift ranges based on an operation signal of a shift operation device, and an electronic control unit configured to permit a vehicle to travel in an automated driving mode. The electronic control unit configured to detect unauthorized access from an outside to a in-vehicle Local Area Network during the automated driving mode. The electronic control unit is configured to perform control to fix a gear position of the automatic transmission when the electronic control unit determines that the unauthorized access from the outside occurs during the automated driving mode.

With the above configuration, when it is determined that unauthorized access is detected, shift control can be prevented from being manipulated through the unauthorized access.

In the vehicle control system, the electronic control unit may be configured to perform control to fix the gear position to a gear position that has already been set at the time of detection of the unauthorized access.

With the above configuration, shift shock that would occur due to change of the gear position can be reduced or prevented.

In the vehicle control system, the electronic control unit may be configured to perform control to fix the gear position to a higher-speed gear position than a gear position that has already been set at the time of detection of the unauthorized access.

With the above configuration, it is possible to more reliably curb reduction of the lifetime of the transmission due to excessive rotation of the transmission, which might occur when unauthorized access occurs.

In the vehicle control system, the electronic control unit may be configured to perform control to reduce a rotational speed of the drive power source.

With the above configuration, it is possible to further reduce the possibility of excessive rotation of the transmission, in the case where unauthorized access occurs, and curb reduction of the lifetime of the transmission due to excessive rotation of the transmission, with further improved reliability.

In the vehicle control system, the drive power source may include an engine and a motor, and the electronic control unit may be configured to restrict drive power of at least one of the engine and the motor.

With the above configuration, rapid acceleration or deceleration through unauthorized access can be curbed or prevented.

In the vehicle control system, the electronic control unit may configured to perform control to fix a shift range as one of the shift ranges established by the shift range switching device, to a shift range that has already been set at the time of detection of the unauthorized access.

With the above configuration, when the shift range is set to a traveling range, the vehicle is able to travel in a limp-home mode, in the traveling range thus set.

A second aspect of the disclosure is concerned with a control method of a vehicle control system. The vehicle control system includes a drive power source, an automatic transmission, a shift range switching device configured to perform switching of shift ranges based on an operation signal of a shift operation device, and an electronic control unit configured to permit a vehicle to travel in an automated driving mode. The control method includes detecting, by the electronic control unit, unauthorized access from an outside to an in-vehicle Local Area Network during the automated driving mode, and performing, by the electronic control unit, control to fix a gear position of the automatic transmission when the electronic control unit determines that the unauthorized access from the outside occurs during the automated driving mode.

With the above configuration, when it is determined that unauthorized access is detected, shift control can be prevented from being manipulated through the unauthorized access.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a skeleton diagram showing the configuration of a vehicular power transmission system of a hybrid vehicle in which the control system of the disclosure is used;

FIG. 3 is an operation table useful for explaining the relationship between shift operation of a transmission, and combinations of operating states of engagement devices used in the shift operation;

DETAILED DESCRIPTION OF EMBODIMENTS

Figure 1:
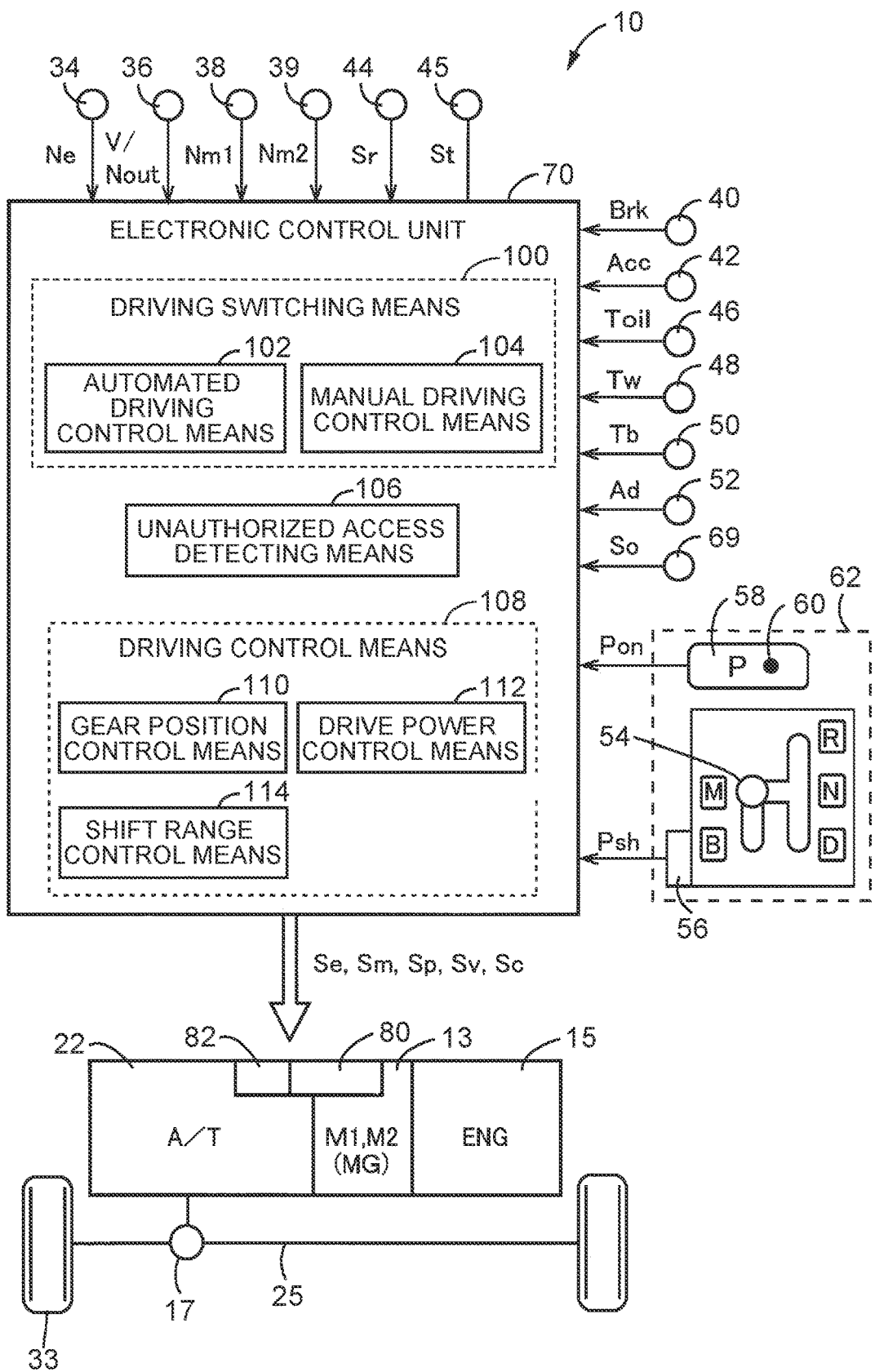
FIG. 1 is a view illustrating the general configuration of each part involved in traveling, of a vehicle to which the disclosure is applied, and also illustrating a principal part of a control system and control functions for controlling each part of the vehicle.

Some embodiments of the disclosure will be described in detail with reference to the drawings. In the following embodiments, parts or components illustrated in the drawings are simplified or modified as needed, and the ratio of dimensions, shape, etc. of each part or component are not necessarily depicted with accuracy.

In FIG. 1, the configuration of a vehicle 10 to which this disclosure is applied is schematically illustrated. FIG. 1 also shows an electric control system for use in the case where unauthorized access occurs to a bus as a communication path included in a vehicle-mounted Local Area Network (LAN), such as Controller Area Network (CAN), of the vehicle 10, during automated driving of the vehicle 10. The vehicle 10 includes an engine 15, and a differential unit 13 comprising a first motor M1, a second motor M2, and so forth, which serve as drive power sources. The drive power generated from the engine 15 and the differential unit 13 is received by an automatic speed change unit 22 corresponding to an automatic transmission 22, and is transmitted to right and left drive wheels 33, via a differential gear device 17 that meshes with an output gear (not shown), and axles 25. Also, one of shift ranges as described below is determined, based on an electric signal Psh from a shift sensor 56 indicating a shift position selected through the driver's operation of a shift operation device 62, i.e., operation of a shift lever 54, or a P switch signal Pon selected through operation of a P switch 58. The shift ranges include a parking range and traveling ranges of the automatic speed change unit 22, which are selectively established by a shift range switching device 82 (which will be called "shift device 82") controlled by an electronic control unit 70. The P switch 58 has a P position indicator 60 indicating that the P switch 58 is operated to ON. The shift operation device 62 and the shift device 82 have known structures, and thus will not be described herein. The electronic control unit 70 performs control of gear positions, by controlling hydraulic actuators of clutches C and brakes B of the automatic speed change unit 22, using a hydraulic control circuit 80 as will be described later.

The skeleton diagram of FIG. 2 shows a vehicular power transmission system 12 (which will be referred to as "power transmission system 12") that provides a part of a drivetrain for a hybrid vehicle as one example of the vehicle 10. In FIG. 2, the power transmission system 12 includes an input shaft 16 as an input rotary member, differential unit 13, automatic speed change unit 22 corresponding to the automatic transmission 22, and an output shaft 24 as an output rotary member, which are arranged in series on a common axis, within a transmission case 14 (which will be referred to as "case 14") as a non-rotary member mounted on the vehicle body. The differential unit 13 functions as a stepless speed change unit directly coupled to the input shaft 16, or indirectly coupled to the input shaft 16 via a pulsation absorbing damper (not shown). The automatic speed change unit 22 is coupled in series with the differential unit 13, via a transmission member (power transmission shaft) 20, in a power transmission path between the differential unit 13 and a pair of drive wheels 33. The output shaft 24 is coupled to the automatic speed change unit 22. The power transmission system 12 is favorably used in a FR (front-engine, rear-drive) vehicle as one type of the vehicle 10 having a longitudinal engine, for example. The vehicle 10 includes the engine 15 as an internal combustion engine, such as a gasoline engine or a diesel engine, which serves as a drive power source for running the vehicle, and is directly coupled to the input shaft 16, or indirectly coupled to the input shaft 16 via a pulsation absorbing damper (not shown). The vehicle 10 also includes the differential unit 13 as a stepless speed change unit that provides a part of the power transmission system 12, and also cooperates with the engine 15 to form the drive power sources. The drive power of the engine 15 and the differential unit 13 is transmitted to the right and left drive wheels 33, while passing through the automatic speed change unit 22 of the power transmission system 12, differential gear unit 17, a pair of axles 25, etc., in the order of description.

The differential unit 13 includes a power distribution mechanism 18, first motor M1, and the second motor M2. The power distribution mechanism 18 is a mechanism that mechanically distributes output of the engine 15 received by the input shaft 16, and serves as a differential mechanism that distributes the output of the engine 15 to the first motor M1 and the transmission member 20. The first motor M1 is coupled to the power distribution mechanism 18 such that power can be transmitted therebetween, and the second motor M2 is operatively coupled to the transmission member 20 such that it can rotate as a unit with the transmission member 20. The first motor M1 and second motor M2 of this embodiment are so-called motor-generators also having a power generating function. The second motor M2 coupled to the drive wheels 33 such that power can be transmitted therebetween has at least a motoring function so as to function as an electric motor for running the vehicle, which delivers drive power as a drive power source for running the vehicle.

The power distribution mechanism 18 is a differential mechanism coupled between the engine 15 and the drive wheels 33, and consists principally of a single-pinion type differential-unit planetary gear device 26. The differential-unit planetary gear device 26 includes a differential-unit sun gear S0, differential-unit planetary gears P0, differential-unit carrier CA0, and a differential-unit ring gear R0, as rotary elements (elements). The differential-unit carrier CA0 supports the differential-unit planetary gears P0 such that the gears P0 can rotate about themselves and about the axis of the planetary gear device 26. The differential-unit ring gear R0 engages with the differential-unit sun gear S0 via the differential-unit planetary gears P0.

In the power distribution mechanism 18, the differential-unit carrier CA0 is coupled to the input shaft 16, or the engine 15, and the differential-unit sun gear S0 is coupled to the first motor M1, while the differential-unit ring gear R0 is coupled to the transmission member 20. The power distribution mechanism 18 thus constructed is placed in a differentially operating state in which the differential-unit sun gear S0, differential-unit carrier CA0, and the differential-unit ring gear R0 as three elements of the differential-unit planetary gear device 26 can rotate relative to each other, to be able to perform differential operation. As a result, the output of the engine 15 is distributed to the first motor M1 and the transmission member 20, and power is stored or the second motor M2 is rotated/driven, with electric energy generated from the first motor M1, using a part of the distributed output of the engine 15. Thus, the differential unit 13 (power distribution mechanism 18) functions as an electric differential device, and is placed in a so-called steplessly speed changing state (electric CVT state), for example, so that the rotational speed of the transmission member 20 is continuously changed, irrespective of rotation of the engine 15 at a given speed.

The automatic speed change unit 22 provides a part of the power transmission path from the differential unit 13 to the output shaft 24, and is in the form of a planetary gear type, multi-speed transmission that functions as an automatic transmission having two or more gear positions. The automatic speed change unit 22 includes a single-pinion type first planetary gear device 28, single-pinion type second planetary gear device 30, and a single-pinion type third planetary gear device 32. The first planetary gear device 28 includes a first sun gear S1, first planetary gears P1, first carrier CA1 that supports the first planetary gears P1 such that the gears P1 can rotate about themselves and about the axis of the gear device 28, and a first ring gear R1 that engages with the first sun gear S1 via the first planetary gears P1. The second planetary gear device 30 includes a second sun gear S2, second planetary gears P2, second carrier CA2 that supports the second planetary gears P2 such that the gears P2 can rotate about themselves and about the axis of the gear device 30, and a second ring gear R2 that engages with the second sun gear S2 via the second planetary gears P2. The third planetary gear device 32 includes a third sun gear S3, third planetary gears P3, third carrier CA3 that supports the third planetary gears P3 such that the gears P3 can rotate about themselves and about the axis of the gear device 32, and a third ring gear R3 that engages with the third sun gear S3 via the third planetary gears P3.

In the automatic speed change unit 22, the first sun gear S1 and the second sun gear S2, which are integrally coupled to each other, are selectively coupled to the transmission member 20 via the second clutch C2, and selectively coupled to the case 14 via the first brake B1. The first carrier CA1 is selectively coupled to the case 14 via the second brake B2, and the third ring gear R3 is selectively coupled to the case 14 via the third brake B3. The first ring gear R1, second carrier CA2, and the third carrier CA3, which are integrally coupled together, are coupled to the output shaft 24, and the second ring gear R2 and the third sun gear S3, which are integrally coupled to each other, are selectively coupled to the transmission member 20 via the first clutch C1.

The automatic speed change unit 22 performs clutch-to-clutch shifting through release of a release-side engagement device(s) and engagement of an apply-side engagement device(s), as indicated in the engagement operation table of FIG. 3, for example, so that a selected one of the gear positions (speeds) is established. In this manner, the speed ratio (=the rotational speed of the transmission member 20/the rotational speed of the output shaft 24) is obtained for each gear position, such that the speed ratio changes at a substantially equal rate.

Figure 4:
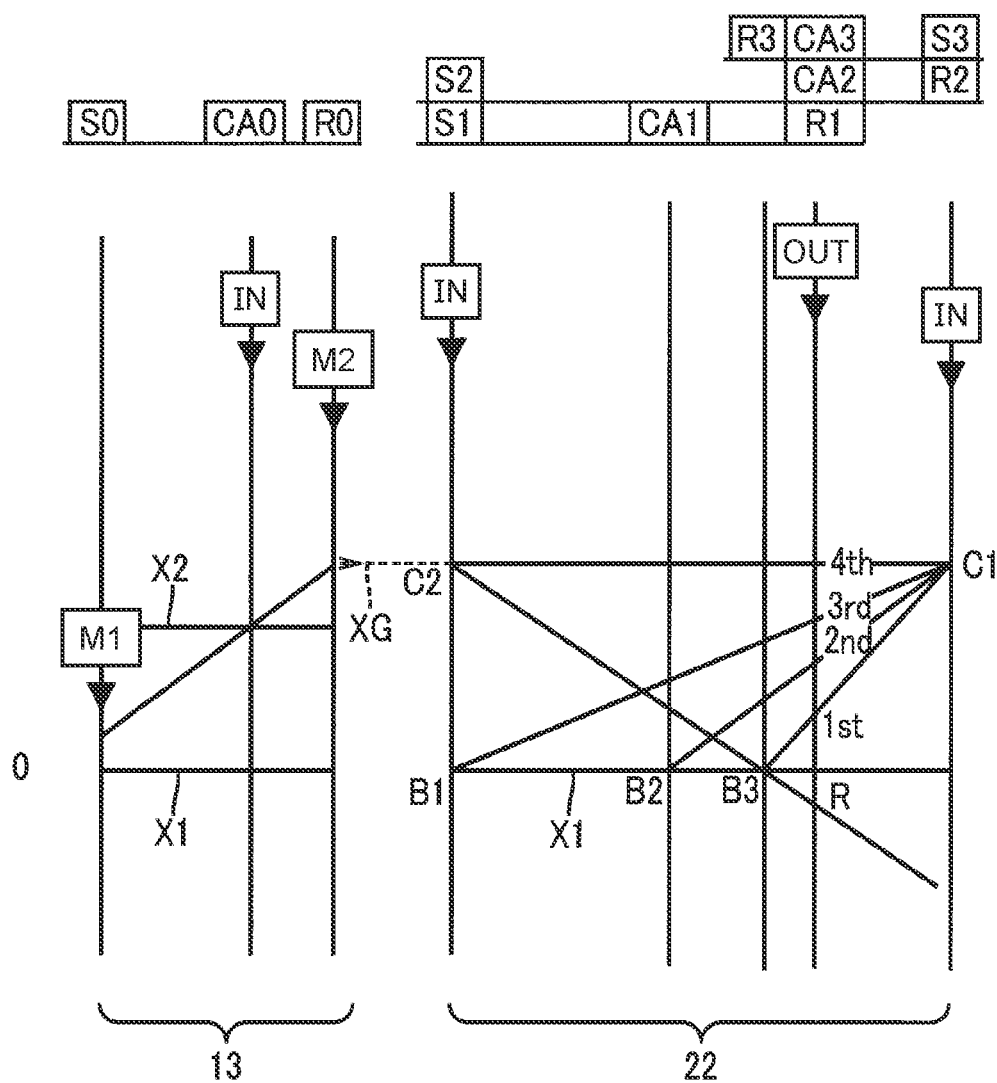
FIG. 4 is a nomographic chart representing the relationship of the rotational speeds of respective rotary elements in a transmission having an electric continuously variable transmission and an automatic transmission.

Regarding the power transmission system 12 constituted by the differential unit 13 and the automatic speed change unit 22, the nomographic chart of FIG. 4 shows the relationships as expressed on straight lines, among the rotational speeds of the respective rotary elements included in the differential unit 13 and the automatic speed change unit 22. The nomographic chart of FIG. 4 is a two-dimensional coordinate system in which the horizontal axis indicates the relationship of the gear ratios of the respective planetary gear devices 26, 28, 30, 32, and the vertical axis indicates the relative rotational speeds. In FIG. 4, the horizontal line X1 indicates the rotational speed being equal to zero, and the horizontal line X2 indicates the rotational speed Ne of the engine 15 coupled to the input shaft 16, while the horizontal line XG indicates the rotational speed of the transmission member 20.

Figure 5:
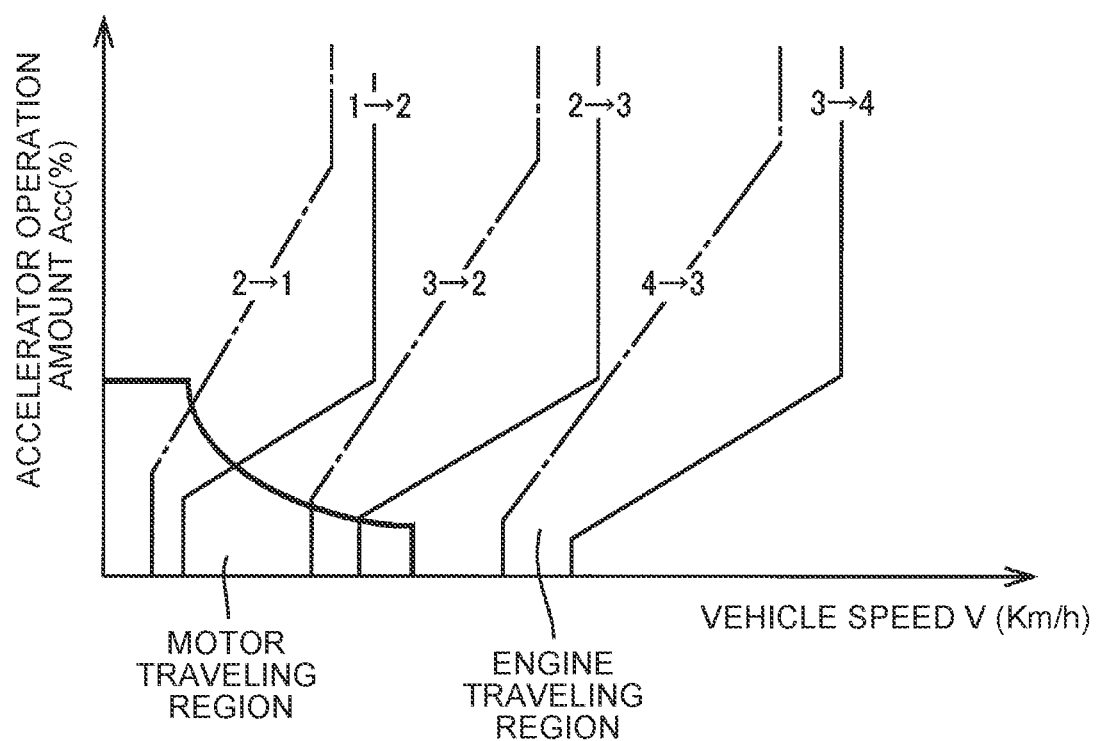
FIG. 5 is a view showing one example of a shift map used for shift control of the automatic transmission, and one example of a power source switching map used for control of switching between an engine traveling mode and a motor traveling mode, and showing the relationship of these maps.

FIG. 5 is a shift diagram (shift map) having upshift lines (solid lines) and downshift lines (one-dot chain lines) stored in advance, with respect to the vehicle speed V (km/h) and the accelerator operation amount Acc (%) as variables. From the shift diagram of FIG. 5, it is determined whether a gearshift should be carried out, based on the actual vehicle speed V and accelerator operation amount Acc. Motor traveling is performed, namely, the vehicle 10 travels with power of the motors M1, M2, in a motor traveling region defined by the thick solid line in FIG. 5, where the engine efficiency is generally reduced, more specifically, in a low vehicle speed region in which the vehicle speed V is relatively low, or a low load region in which the accelerator operation amount Acc is small.

Referring back to FIG. 1, the vehicle 10 has the electronic control unit 70 including a traveling controller that controls each part associated with traveling of the vehicle. The electronic control unit 70 includes a so-called microcomputer having CPU, RAM, ROM, input and output interfaces, and so forth, for example, and the CPU executes various controls of the vehicle 10, by performing signal processing according to programs stored in advance in the ROM, while utilizing the temporary storage function of the RAM. The electronic control unit 70 includes two or more control units, or two or more computers, which perform vehicle control, such as hybrid drive control concerned with the engine 15, first motor M1, second motor M2, etc., and hydraulic control. The two or more control units are connected to each other via the vehicle-mounted LAN or CAN bus, and send and receive signals on the CAN bus, so as to perform control associated with traveling of the vehicle.

The electronic control unit 70 receives an engine speed Ne (rpm) detected by an engine speed sensor 34, vehicle speed V (km/h) corresponding to the rotational speed Nout of the output shaft 24 detected by a vehicle speed sensor 36, signal Nm1 indicating the rotational speed (rpm) of the first motor M1 detected by a rotational speed sensor, such as a resolver 38, and the direction of its rotation, and a signal Nm2 indicating the rotational speed of the second motor M2 detected by a rotational speed sensor, such as a resolver 39, and the direction of its rotation. The electronic control unit 70 also receives a received signal Sr, such as big data and automated driving commands received from a receiver 44, transmission signal St, such as communication data for use in communications with other vehicles, which data is transmitted from the vehicle 10 via a transmitter 45, brake signal Brk detected by a foot brake sensor 40, and the accelerator operation amount Acc (%) detected by an accelerator pedal position sensor 42. The electronic control unit 70 further receives an AT oil temperature Toil (° C.) of the automatic speed change unit 22 detected by an AT oil temperature sensor 46, engine water temperature Tw (° C.) detected by an engine water temperature sensor 48, and a battery temperature Tb (° C.) detected by a battery temperature sensor 50 and used for calculation of the state of charge or charge capacity SOC of a battery (not shown). The electronic control unit 70 also receives an automated driving mode selection signal Ad indicating that automated driving is selected, and transmitted from an automated driving mode selection switch 52, or from the outside via the receiver 44, a signal So from an obstacle sensor 69, such as a millimeter-wave radar, or a TV camera, which detects an obstacle(s) ahead, and so forth.

Also, the electronic control unit 70 outputs signals for controlling the engine 15, for example, control signals Se for controlling engine output or power, more specifically, an opening signal indicative of an opening degree of an electronic throttle valve of the engine 15, a supercharging pressure regulation signal for regulating the supercharging pressure, an ignition signal that designates the ignition timing of the engine 15, etc. The electronic control unit 70 further outputs a command signal Sm that directs operation of the motors M1, M2, shift range signal Sp that designates the shift range of the shift device 82, valve command signal Sv that actuates electromagnetic valves included in the hydraulic control circuit 80 for controlling hydraulic actuators (not shown) of the clutches C and brakes B of the differential unit 13 and the automatic speed change unit 22, acceleration/deceleration, steering and brake signals Sc for use in automated driving, and so forth.

Figure 6:
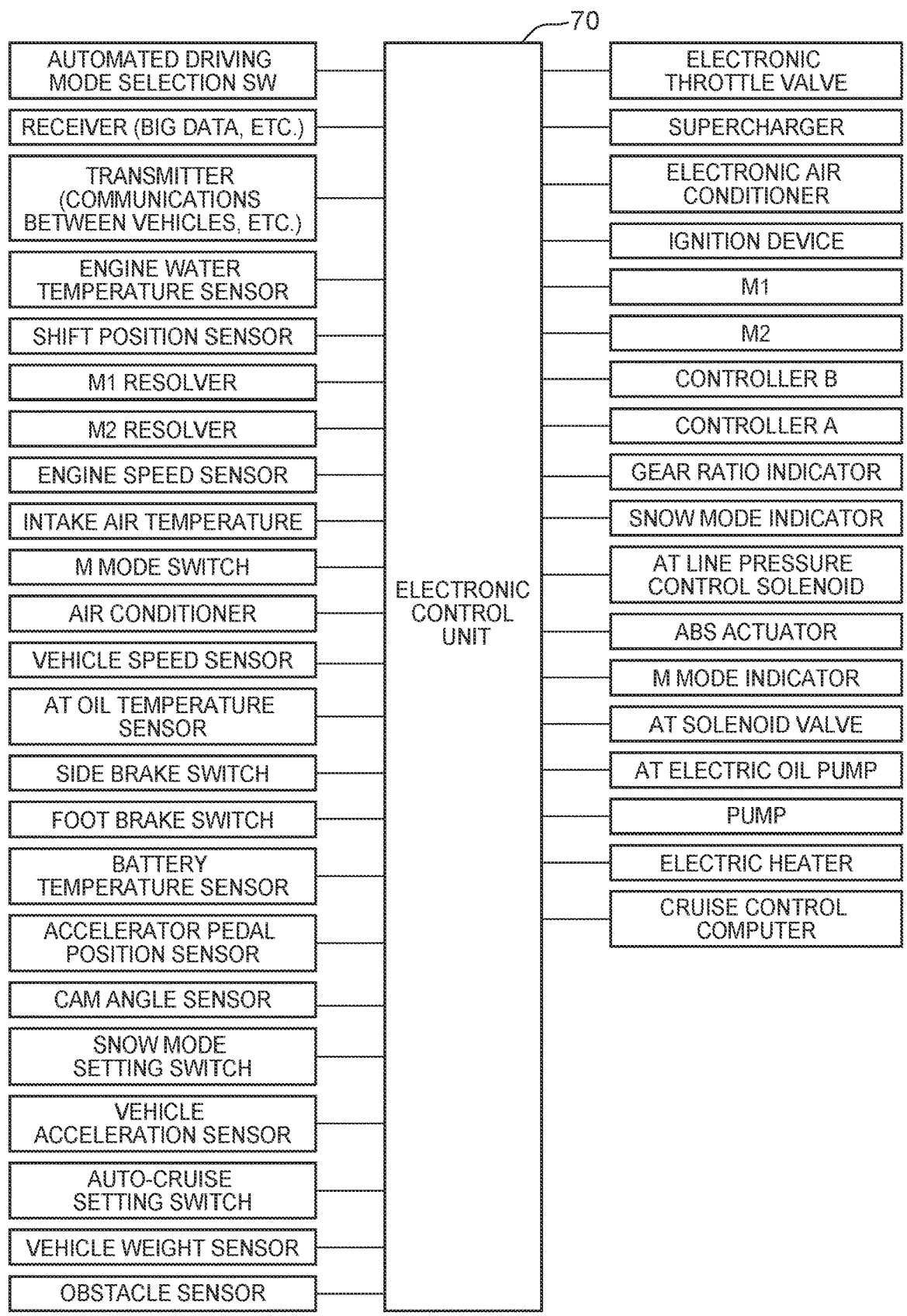
FIG. 6 is a view useful for explaining input and output signals of an electronic control unit provided in the vehicular power transmission system of FIG. 1.

As shown in FIG. 6, the electronic control unit 70 inputs and outputs various signals other than those indicated above. For example, the electronic control unit 70 outputs signals, etc. to a supercharger, electric air conditioner, various indicators, electric oil pump, electric heater, and a cruise control computer. Also, from respective sensors and switches shown in FIG. 6, the electronic control unit 70 is supplied with a signal indicating the intake air temperature, signal that designates the M mode (manual shift traveling mode), air-conditioner signal indicating operation of the air conditioner, signal indicating side-brake operation, cam angle signal, snow-mode setting signal indicating snow-mode setting, acceleration signal indicating the longitudinal acceleration of the vehicle, auto-cruise signal indicating that automated cruise traveling is selected, vehicle weight signal indicating the weight of the vehicle, and so forth.

Referring back to FIG. 1, a principal part of functions of the electronic control unit 70 for controlling the shift gear position, when unauthorized access to the vehicle-mounted LAN occurs, is illustrated. The electronic control unit 70 of the vehicle 10 includes a driving switching means 100, unauthorized access detecting means 106, and a driving control means 108, as a principal part of its control functions. The driving switching means 100 defined by a broken line in FIG. 1 has an automated driving control means 102 and a manual driving control means 104. The automated driving control means 102 carries out automated driving to drive the vehicle 10 without driving operation of a passenger on the vehicle 10, namely, without acceleration/deceleration, steering, and braking operation. The automated driving control means 102 also deals with manned driving with a passenger present in the vehicle 10, and unmanned driving with no passenger present in the vehicle 10. Whether the vehicle 10 is in the manned driving mode or unmanned driving mode is determined based on a decision made with a sensor installed on a vehicle seat, selection using a panel (not shown) provided in the vehicle, and whether remote operation is performed in a remote control mode, for example. The driving control means 108 defined by a dotted line in FIG. 1 includes a gear position control means 110, drive power control means 112, and a shift range control means 114.

When the vehicle 10 receives an automated driving mode selection signal Ad from the automated driving mode selection switch 52, or receives an automated driving mode selection signal Ad via the receiver 44, the driving switching means 100 of the electronic control unit 70 selects control based on automated driving control of the automated driving control means 102, and starts automated driving of the vehicle 10. The automated driving control means 102 determines a traveling route, based on a command issued from the passenger to the vehicle 10, or the content of a command received via the receiver 44, in view of data from other vehicles, congestion situation, etc., received via the receiver 44, and starts automated driving of the vehicle 10.

The unauthorized access detecting means 106 determines whether a signal determined as unauthorized access is included in signals transmitted on the vehicle-mounted LAN, such as a CAN bus. In some cases of unauthorized access, the vehicle 10 may be controlled by a third party without permission, for example, and forced accelerating operation, braking operation, shifting operation, or the like, may be performed. In other cases, control signals of the vehicle 10 may be tampered or altered; for example, the AT oil temperature signal Toil of the AT oil temperature sensor 46, engine water temperature signal Tw of the engine water temperature sensor 48, battery temperature signal Tb of the battery temperature sensor 50 for use in calculation of the state of charge or charge capacity SOC of the battery, etc. may be tampered or altered, whereby appropriate control of the vehicle 10 may be impeded. The unauthorized access is detected by specifying or detecting variations of the signal amount, shape of signal, and signal value, which are different from normal, in the signals on the CAN bus, for example. Namely, the unauthorized access detecting means 106 has a program for determining whether there is an increase or decrease in the signal amount which is larger than a predetermined value, change of the shape of signal which exceeds a predetermined range, variations of the signal value larger than a predetermined value, etc., in the signals on the CAN bus. The unauthorized access detecting means 106 detects unauthorized access based on the result of the determination.

When any unauthorized access is detected by the unauthorized access detecting means 106, the gear position control means 110 of the driving control means 108 fixes the gear position of the automatic speed change unit 22 to the gear position that has already been set at the time of detection of the unauthorized access.

Figure 7:
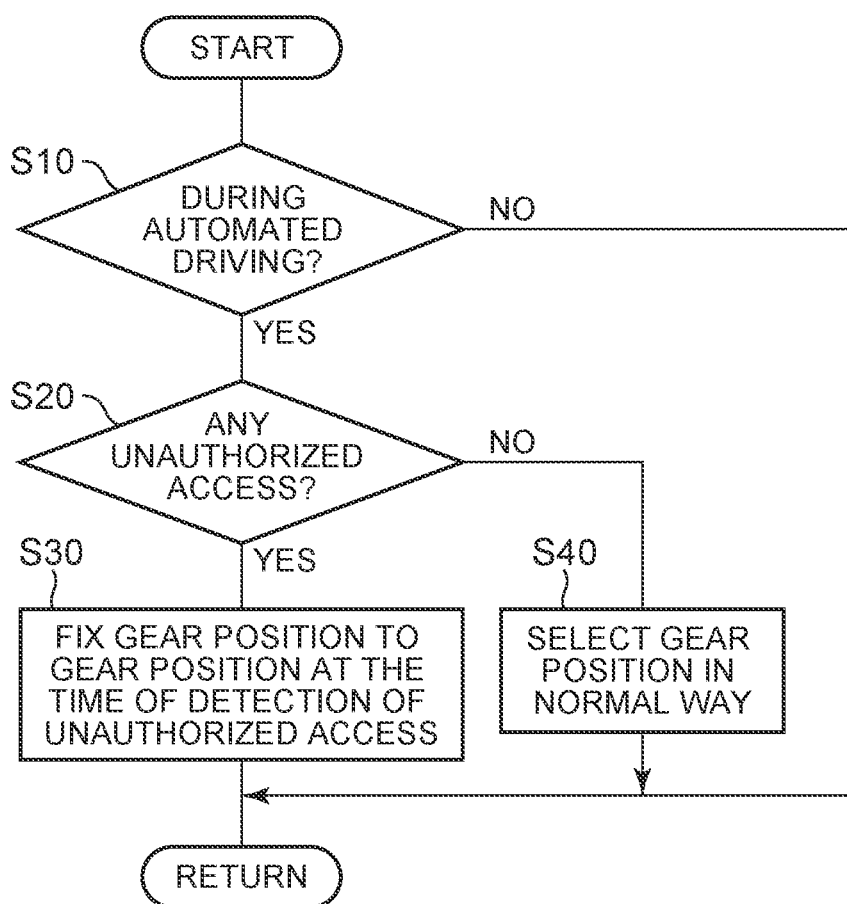
FIG. 7 is a flowchart illustrating control to fix the gear position, upon occurrence of unauthorized access.

FIG. 7 is a flowchart illustrating a principal part of control operation of the electronic control unit 70, namely, control operation to fix the gear position when unauthorized access occurs.

In FIG. 7, in step S10 corresponding to the driving switching means 100 and the automated driving control means 102 of the vehicle 10, it is determined whether the vehicle 10 is traveling in the automated driving mode. When a negative decision (NO) is obtained in step S10, namely, when automated driving is not performed, the determination of step S10 is repeatedly made. When an affirmative decision (YES) is obtained in step S10, it is determined in step S20 corresponding to the unauthorized access detecting means 106 whether there is unauthorized access. When a negative decision (NO) is obtained in step S20, the gear position is set in a normal way, in step S40 corresponding to the gear position control means 110 of the driving control means 108. Namely, in step S40, the gear position determined based on the vehicle speed V, accelerator operation amount Acc, etc. is selected. When an affirmative decision (YES) is obtained in step S20, namely, when it is determined that unauthorized access is detected, the gear position is fixed to the gear position that has already been set at the time of detection of the unauthorized access, in step S30 corresponding to the gear position control means 110 of the driving control means 108.

According to this embodiment, the electronic control unit 70 of the vehicle 10 includes the automated driving control means 102 for automatically driving the vehicle 10 including the differential unit 13 and the engine 15 as drive power sources, automatic speed change unit 22, and the shift device 82 that performs switching of the shift ranges based on operation signals Psh, Pon of the shift operation device 62, and also includes the unauthorized access detecting means 106 for detecting unauthorized access from the outside to the CAN as the vehicle-mounted LAN during automated driving. In the electronic control unit 70, when it is determined that unauthorized access from the outside occurs during automated driving, the gear position of the automatic speed change unit 22 is fixed to the gear position that has already been set at the time of detection of the unauthorized access. Thus, when it is determined that unauthorized access is detected, shift control can be prevented from being manipulated through the unauthorized access. Also, since the gear position is fixed to the gear position that has already been set at the time of detection of the unauthorized access, shift shock that would occur due to change of the gear position can be reduced or prevented.

Next, a second embodiment of the disclosure will be described. In the following description, the same reference numerals are assigned to portions and components common to the above embodiment and the following embodiments.

The second embodiment is identical with the first embodiment in that, when it is determined that unauthorized access is detected, the gear position is fixed to the gear position that has already been set at the time of detection of the unauthorized access. The second embodiment is different from the first embodiment in that the shift range is also fixed to the shift range that has already been set at the time of detection of the unauthorized access. In the other respects, the second embodiment is substantially identical with the above embodiment.

Figure 8:
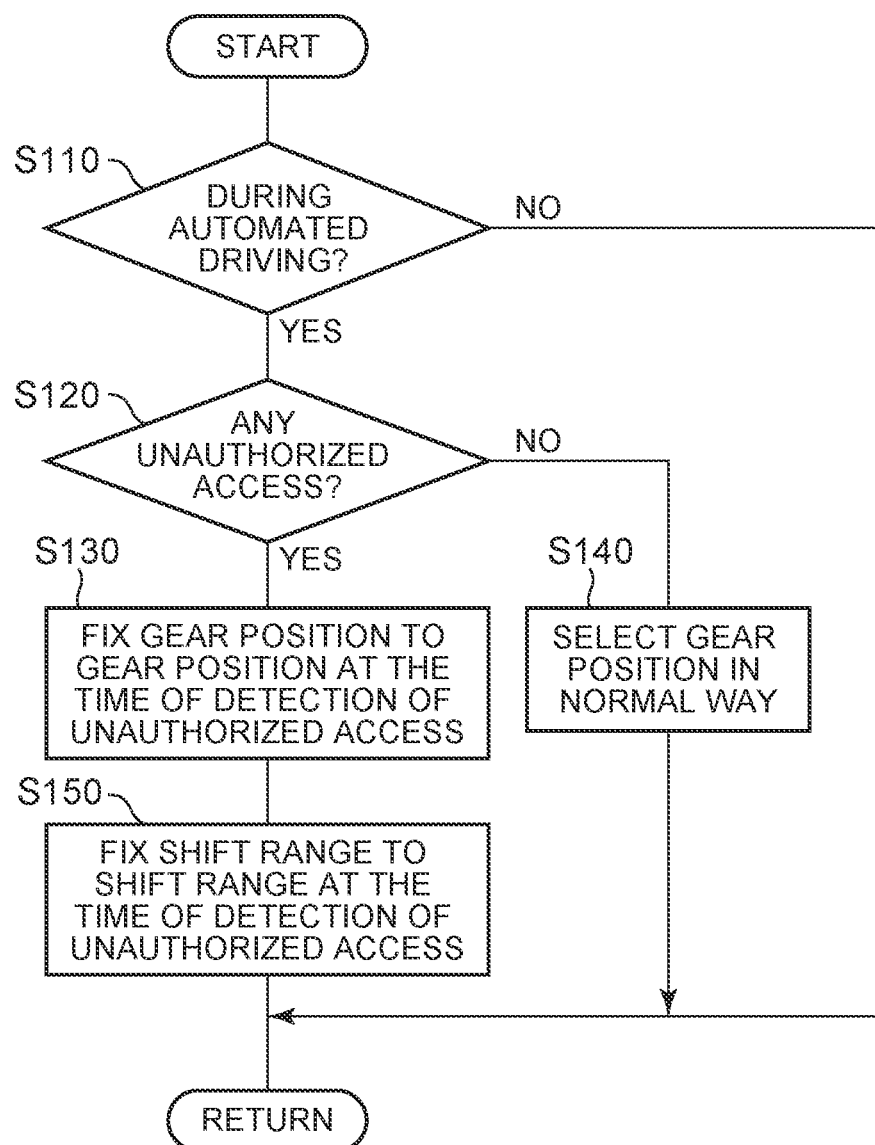
FIG. 8 is a flowchart illustrating control to fix the gear position and the shift range, upon occurrence of unauthorized access.

In the flowchart of FIG. 8, the step of fixing the shift range to the shift range that has already been set at the time of detection of unauthorized access is added to the flowchart of the above embodiment. In step S110 corresponding to the driving switching means 100 and the automated driving control means 102, it is determined whether the vehicle 10 is traveling in the automated driving mode. When a negative decision (NO) is obtained in step S110, namely, when automated driving is not performed, the determination of step S110 is repeatedly made. When an affirmative decision (YES) is obtained in step S110, it is determined in step S120 corresponding to the unauthorized access detecting means 106 whether there is any unauthorized access. When a negative decision (NO) is obtained in step S120, the gear position is set in a normal way, in step S140 corresponding to the gear position control means 110 of the driving control means 108. Namely, the gear position determined based on the vehicle speed V, accelerator operation amount Acc, etc., during automated driving is selected in step S140. When an affirmative decision (YES) is obtained in step S120, namely, when it is determined that unauthorized access is detected, the gear position is fixed to the gear position that has already been set at the time of detection of the unauthorized access, in step S130 corresponding to the gear position control means 110 of the driving control means 108. Further, in step S150 corresponding to the shift range control means 114, the shift range is fixed to the shift range that has already been set at the time of detection of the unauthorized access.

According to this embodiment, as in the above embodiment, when it is determined that unauthorized access is detected, the shift control can be prevented from being manipulated through the unauthorized access. Also, the gear position is fixed to the gear position that has already been set at the time of detection of the unauthorized access, so that shift shock that would occur due to change of the gear position can be reduced or prevented. Further, the shift range is fixed to the shift range that has already been set at the time of detection of the unauthorized access; therefore, when the shift range is set to a traveling range, the vehicle is able to travel in a limp-home mode in the traveling range thus set.

Next, a third embodiment of the disclosure will be described.

In the first and second embodiments, when unauthorized access is detected, the gear position is fixed to the gear position that has already been set at the time of detection of the unauthorized access. In the third embodiment, when unauthorized access is detected, the gear position is fixed to a higher-speed gear position than the gear position that has already been set at the time of detection of the unauthorized access, rather than the gear position that has already been set at the time of detection of the unauthorized access. Further, the third embodiment is different from the first and second embodiments in that the rotational speed of the drive power source, namely, the differential unit 13 or the engine 15, is reduced. In the other respects, the third embodiment is substantially identical with the second embodiment.

Figure 9:
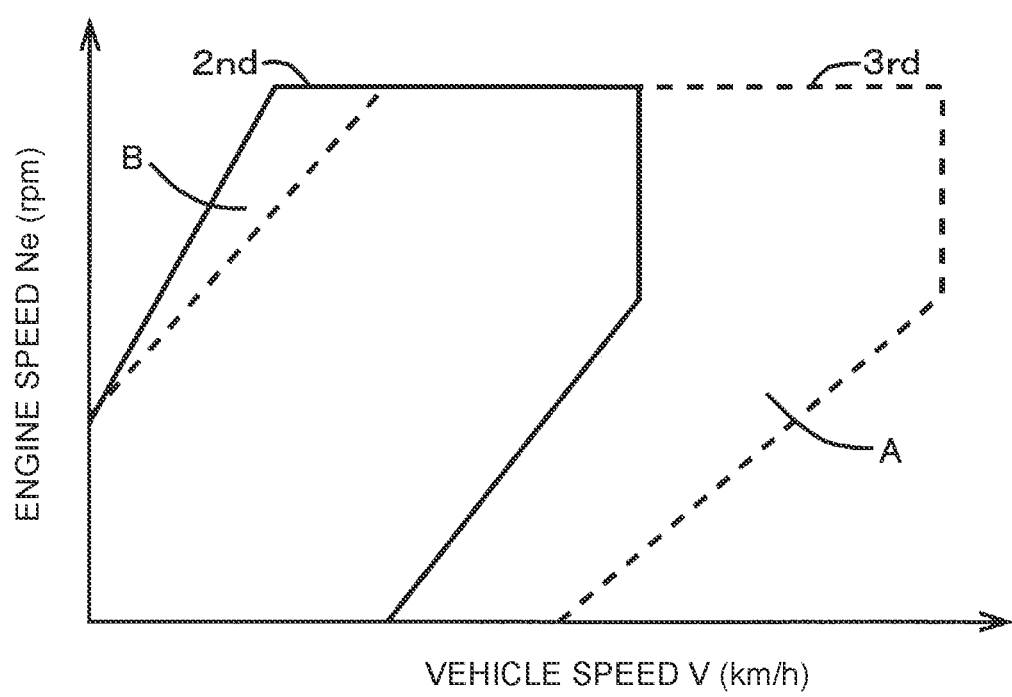
FIG. 9 is a view useful for explaining permissible rotation regions and excessive rotation regions of the automatic transmission placed in shift gear positions.

FIG. 9 shows one example of the ranges of the permissible rotational speeds of the planetary gear devices 28, 30, 32 used in the transmission 22, when it is placed in the second-speed (2nd) gear position and the third-speed (3rd) gear position, in relation to the vehicle speed V and the engine speed Ne of the vehicle 10. The range inside the solid line, i.e., the range defined by the solid line, is the range permitted in the second-speed gear position, and the outside of the solid line indicates a range representing excessive rotation that is not permitted in the second-speed gear position. Similarly, the range inside the broken line, i.e., the range defined by the broken line, is the range permitted in the third-speed gear position, and the outside of the broken line indicates a range representing excessive rotation that is not permitted in the third-speed gear position. Also, "A" denotes a range that is permitted in the third-speed gear position, but not permitted in the second-speed gear position, and "B" denotes a range that is permitted in the second-speed gear position, but not permitted in the third-speed gear position. As indicated by "A" in FIG. 9, the higher-speed gear position generally has a permissible range that extends to the higher-speed side of the vehicle speed V, as compared with the lower-speed gear position. Also, as indicated by "B" in FIG. 9, the higher-speed gear position has a range that is not permitted due to excessive rotation, i.e., range B, when the engine speed Ne is high on the low vehicle-speed side. Therefore, when unauthorized access is detected, the gear position is set to the higher-speed gear position, namely, to the third- or higher-speed gear position when the current gear position is the second-speed gear position, so that excessive rotation within the transmission 22 is curbed or prevented over a broader range of the vehicle speed V and the engine speed Ne. Further, by reducing the engine speed Ne, it is possible to more effectively curb excessive rotation. While FIG. 9 shows the case where the engine 15 is used as the drive power source, it is possible to curb excessive rotation of the automatic speed change unit 22, even in the case where the vehicle has two drive power sources, i.e., the differential unit 13 and the engine 15. In this case, too, when unauthorized access is detected, the higher-speed gear position than the gear position that has already been set at the time of detection of the unauthorized access is selected as the gear position of the automatic speed change unit 22, so that excessive rotation of the automatic speed change unit 22 can be curbed. Also, it is possible to more effectively curb excessive rotation, by reducing the rotational speed of the drive power source consisting of the differential unit 13 and the engine 15 relative to that of the automatic speed change unit 22, namely, the rotational speed of the transmission member 20. The rotational speed of the transmission member 20 is equal to the second motor speed Nm2 of the second motor M2, and will be denoted as "second motor speed Nm2".

Figure 10:
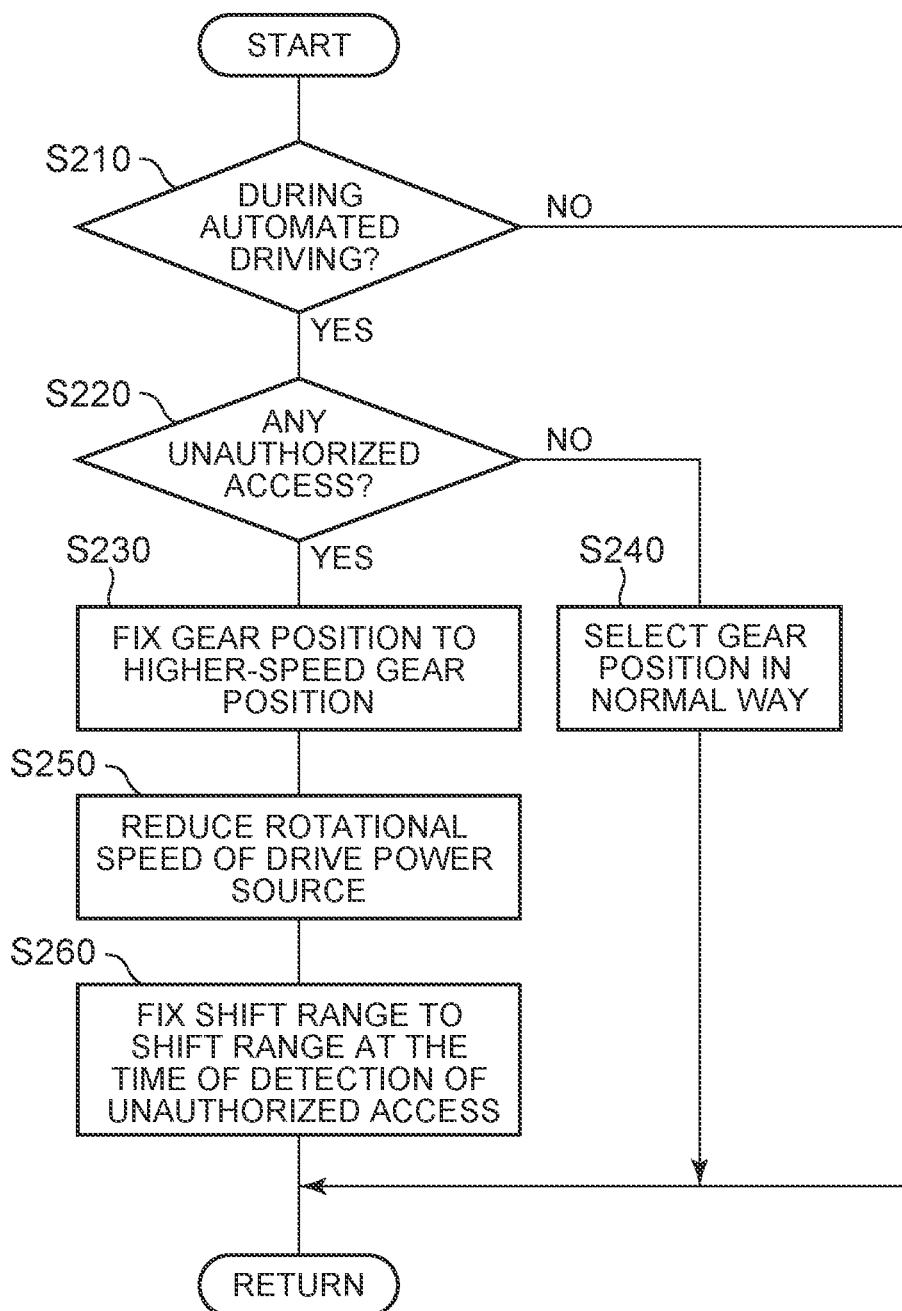
FIG. 10 is a flowchart illustrating control to fix the gear position to a higher-speed gear position, reduce the rotational speed of a drive power source, and fix the shift range, upon occurrence of unauthorized access.

In the flowchart of FIG. 10, the gear position is set to the higher-speed gear position than the gear position that has already been set at the time of detection of unauthorized access, instead of being fixed to the gear position that has already been set at the time of detection of unauthorized access as in the second embodiment, and the second motor speed Nm2 as the rotational speed of the drive power source is reduced. In step S210 corresponding to the driving switching means 100 and the automated driving control means 102, it is determined whether the vehicle 10 is traveling in the automated driving mode. When a negative decision (NO) is obtained in step S210, namely, when automated driving is not performed, the determination of step S210 is repeatedly made. When an affirmative decision (YES) is obtained in step S210, it is determined in step S220 corresponding to the unauthorized access detecting means 106 whether there is any unauthorized access. When a negative decision (NO) is obtained in step S220, the gear position is set in a normal way, in step S240 corresponding to the gear position control means 110 of the driving control means 108. Namely, the gear position determined based on the vehicle speed V, accelerator operation amount Acc, etc. is selected in step S240. When an affirmative decision (YES) is obtained in step S220, namely, when it is determined that unauthorized access is detected, the gear position is set to the higher-speed gear position than the gear position that has already been set at the time of detection of the unauthorized access, in step S230 corresponding to the gear position control means 110 of the driving control means 108. Further, in step S250 corresponding to the drive power control means 112, the rotational speed of the engine 15 and the differential unit 13 as the drive power source, namely, the second motor rotational speed Nm2, is reduced. In step S260 corresponding to the shift range control means 114, the shift range is fixed to the shift range that has already been set at the time of detection of the unauthorized access.

According to this embodiment, the gear position is set to the higher-speed gear position than the gear position that has already been set at the time of detection of unauthorized access. As a result, when it is determined that unauthorized access is detected, it is possible to prevent shift control from being manipulated through the unauthorized access, as in the above embodiments. Also, where the shift range is set to a traveling range when the unauthorized access is detected, the vehicle is able to travel in a limp-home mode, in the traveling range thus set. Further, according to this embodiment, it is possible to more reliably curb reduction of the lifetime of the transmission due to excessive rotation of the transmission, which might occur when unauthorized access takes place. Also, the rotational speed of the drive power source is reduced. As a result, it is possible to further reduce the possibility of excessive rotation of the transmission, in the case where unauthorized access occurs, and even more reliably curb reduction of the lifetime of the transmission due to excessive rotation of the transmission.

In the first embodiment to the third embodiment as described above, the vehicle 10 includes the motors M1, M2 as drive power sources other than the engine 15. However, the disclosure is not particularly limited to this arrangement. For example, similar effects can be expected, in control of the gear position and the shift range at the time of occurrence of unauthorized access, in a vehicle that does not include the motors M1, M2, but only has an internal combustion engine, such as a gasoline engine, or a diesel engine, or an electric vehicle having only the motor M1 as a drive power source.

Next, a fourth embodiment of the disclosure will be described.

The first embodiment to the third embodiment, and their effects, may be applied to any of the vehicle 10 having the engine 15 and the motors M1, M2 as drive power sources, vehicle 10 having only the engine 15, and the vehicle 10 having only the motors M1, M2. The motors M1, M2 as drive power sources may be replaced with a single motor M1. The fourth embodiment is different from the above embodiments in that it is applied to the vehicle 10 having the engine 15 and the motors M1, M2 as drive power sources, and the drive power of any of the engine 15 and the motors M1, M2 is restricted. In the other respects, the fourth embodiment is identical with the first embodiment.

Figure 11:
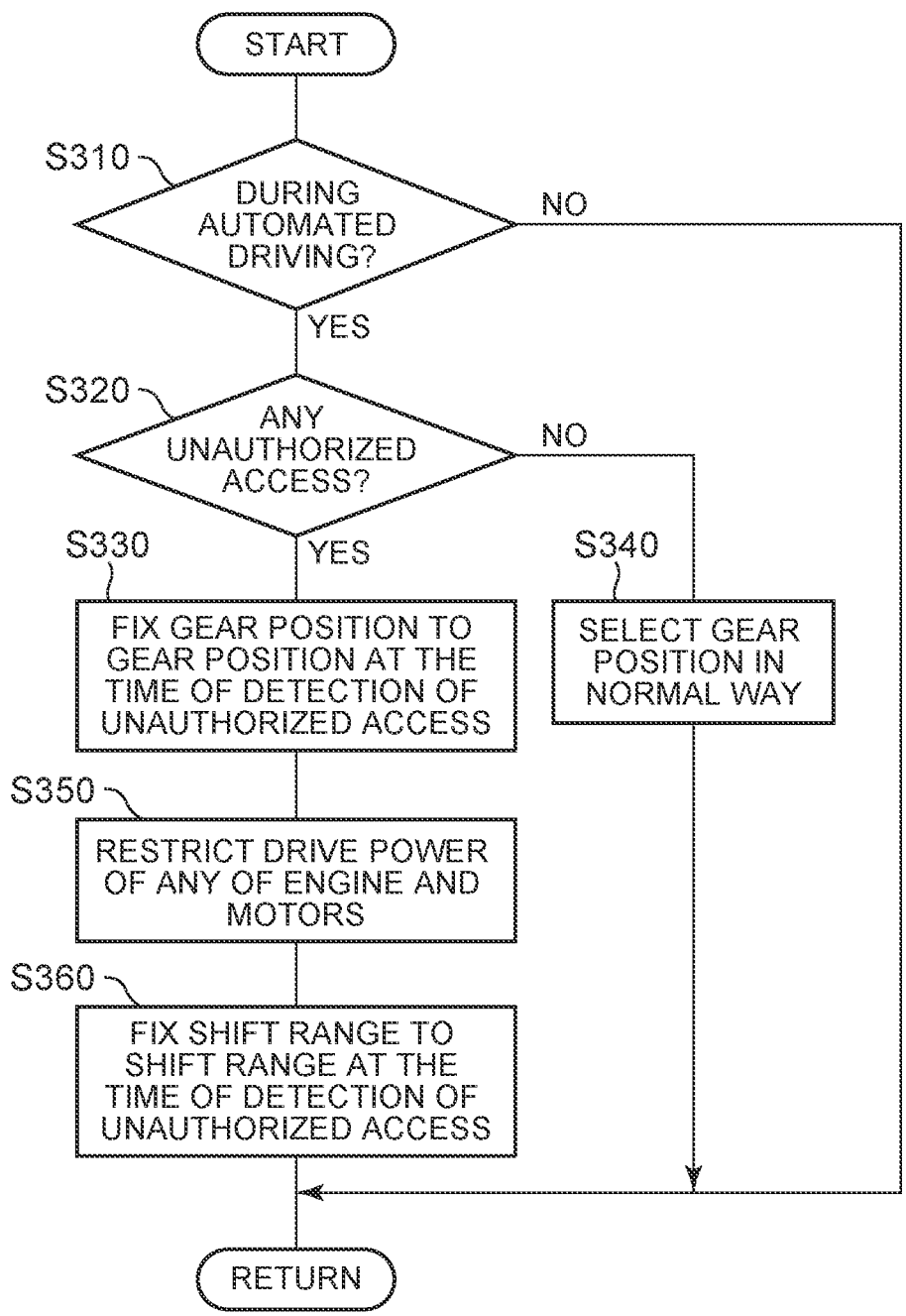
FIG. 11 is a flowchart illustrating control to restrict drive power of any of an engine and motors, in addition to control of the gear position in FIG. 8, in a vehicle having the engine and the motors as drive power sources.

In FIG. 11, in step S310 corresponding to the driving switching means 100 and the automated driving control means 102 of the vehicle 10, it is determined whether the vehicle 10 is traveling in the automated driving mode. When a negative decision (NO) is obtained in step S310, namely, when automated driving is not performed, the determination of step S310 is repeatedly made. When an affirmative decision (YES) is obtained in step S310, it is determined in step S320 corresponding to the unauthorized access detecting means 106 whether there is any unauthorized access. When a negative decision (NO) is obtained in step S320, the gear position is set in a normal way, in step S340 corresponding to the gear position control means 110 of the driving control means 108. Namely, the gear position determined based on the vehicle speed V, accelerator operation amount Acc, etc. is selected in step S340. When an affirmative decision (YES) is obtained in step S320, namely, when it is determined that unauthorized access is detected, the gear position is fixed to the gear position that has already been set at the time of detection of the unauthorized access, in step S330 corresponding to the gear position control means 110 of the driving control means 108. Also, in step S350 corresponding to the drive power control means 112, the drive power of any of the engine 15 and the motors M1, M2 is restricted to be equal to or smaller than predetermined drive power. Further in step S360 corresponding to the shift range control means 114, the shift range is fixed to the shift range that has already been set at the time of detection of the unauthorized access.

According to this embodiment, when it is determined that unauthorized access is detected, shift control can be prevented from being manipulated through the unauthorized access. Also, the gear position is fixed to the gear position that has already been set at the time of detection of the unauthorized access, so that shift shock that would occur due to change of the gear position can be reduced or prevented. Further, in the vehicle 10 having the engine 15 and the motors M1, M2 as drive power sources, the drive power of at least one of the engine 15 and the motors M1, M2 is restricted. As a result, rapid acceleration or deceleration through the unauthorized access can be curbed or prevented.

Next, a fifth embodiment of the disclosure will be described. In the following description, the same reference numerals are assigned to portions and components common to the above embodiments and this embodiment.

Figures 12, 13:
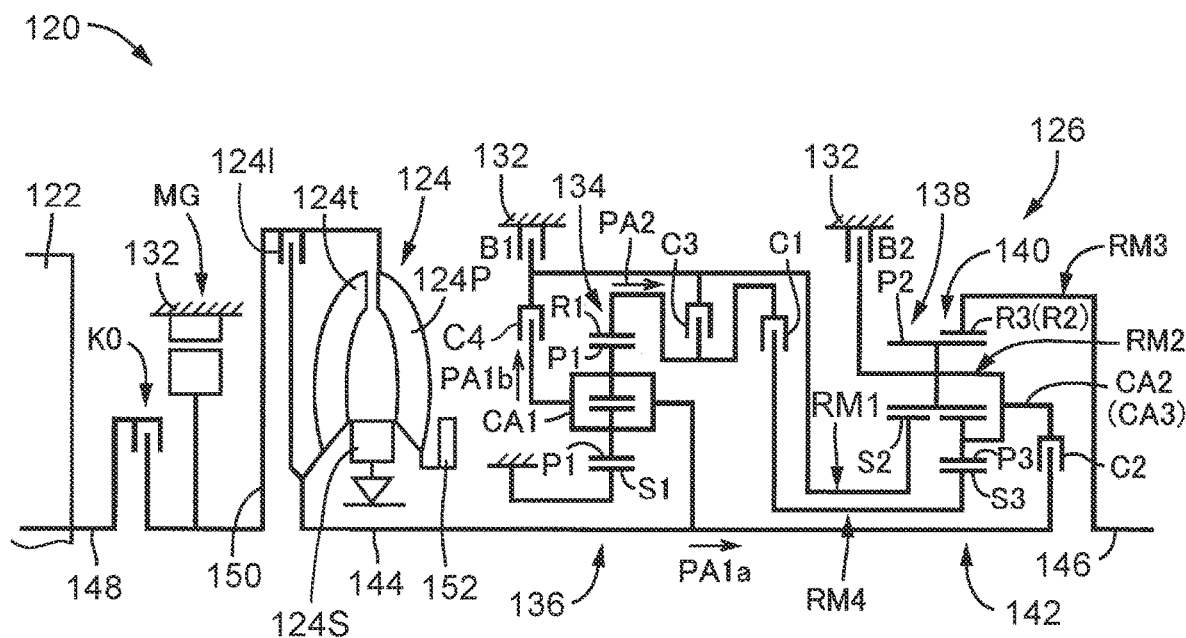
FIG. 12 is a skeleton diagram showing the configuration of a vehicular power transmission system of another type of hybrid vehicle in which the control system of the disclosure is used.
FIG. 13 is an operation table useful for explaining the relationship between shift operation of a transmission of FIG. 12, and combinations of operating states of engagement devices used in the shift operation.

The skeleton diagram of FIG. 12 shows the configuration of a power transmission system 120 of another type of hybrid vehicle to which the disclosure is favorably applied. In the power transmission system 120 of the hybrid vehicle, too, when unauthorized access is detected, the gear position and the shift range are fixed, as in the first embodiment, second embodiment, third embodiment, and the fourth embodiment, and similar effects can be obtained. The electronic control unit 70 has the same functions of the automated driving control means 102, unauthorized access detecting means 106, and the driving control means 108 as those of the above embodiments, for which the same reference numerals are used, and which are not separately illustrated. The power transmission system 120 is constructed generally symmetrically with respect to the center line (axis), and the lower half of the system 120 below the axis is not illustrated in the skeleton diagram of FIG. 12. As shown in FIG. 12, the power transmission system 120 of this embodiment includes an engine 122, a motor MG a clutch K0 provided in a power transmission path between the engine 122 and the motor MG for controlling power transmission in the power transmission path according to its engagement state, a torque converter 124 having an input member coupled to the clutch K0, and an automatic transmission 126 provided in a power transmission path between the torque converter 124, and the drive wheels 33 and the differential gear device 17. Thus, in this embodiment, the clutch K0, torque converter 124, and the automatic transmission 126 constitute the power transmission system.

The clutch K0 is a multi-disc type hydraulic friction device, for example. When the clutch K0 is engaged, power is transmitted in the power transmission path between a crankshaft 148 of the engine 122 and a front cover 150 of the torque converter 124 (namely, the crankshaft 148 is connected to the front cover 150). When the clutch K0 is released, power transmission in the power transmission path between the crankshaft 148 of the engine 122 and the front cover 150 of the torque converter 124 is cut off (namely, the crankshaft 148 is disconnected from the front cover 150).

The torque converter 124 is a fluid-type power transmission device that performs power transmission via fluid. The torque converter 124 includes a pump impeller 124$p$ coupled to the crankshaft 148 of the engine 122 via the clutch K0, a turbine wheel 124$t$ coupled to the automatic transmission 126 via a turbine shaft corresponding to an output member, and a stator wheel 124$s$ provided between the pump impeller 124$p$ and the turbine wheel 124$t$. A lock-up clutch 124$l$ is provided between the pump impeller 124$p$ and the turbine wheel 124$t$. The lock-up clutch 124$l$ is configured to cause the pump impeller 124$p$ and the turbine wheel 124$t$ to rotate as a unit when it is engaged. The pump impeller 124$p$ is coupled to a mechanical hydraulic pump 152, such as a vane pump. In operation, the hydraulic pump 152 is driven as the pump impeller 124$p$ rotates, so as to generate a hydraulic pressure that provides an original pressure of a hydraulic control circuit, or the like, which is not illustrated in the drawings.

The automatic transmission 126 includes a first speed change unit 136 and a second speed change unit 142, which are arranged on a common axis, within a transmission case (which will be referred to as "case") 132 as a non-rotary member mounted to the vehicle body, and is operable to change the speed of rotation of an input shaft 144, and deliver the resulting rotary power from an output shaft 146. The first speed change unit 136 consists principally of a double-pinion type first planetary gear device 134, and the second speed change unit 142 consists principally of a single-pinion type second planetary gear device 138 and a double-pinion type third planetary gear device 140. In this embodiment, the input shaft 144 is the turbine shaft of the torque converter 124.

The first planetary gear device 134 includes a sun gear S1, two or more pairs of mutually meshing pinion gears P1, a carrier CA1 that supports the pinion gears P1 such that the gears P1 can rotate about themselves and about the axis of the gear device 134, and a ring gear R1 that engages with the sun gear S1 via the pinion gears P1. The sun gear S1, carrier CA1, and the ring gear R1 provide three rotary elements of the first planetary gear device 134. The carrier CA1 is coupled to the input shaft 144 to be rotated or driven, and the sun gear S1 is fixed integrally to the case 132 so as to be unable to rotate. The ring gear R1, which functions as an intermediate output member, is rotated at a reduced speed relative to the input shaft 144, and transmits rotation to the second speed change unit 142. Paths through which rotation of the input shaft 144 is transmitted to the second speed change unit 142 while keeping its speed are referred to as first intermediate output paths PA1 through which rotation is transmitted at a predetermined constant speed ratio (=1.0). The first intermediate output paths PA1 include a direct connecting path PA1$a$ through which rotation is transmitted from the input shaft 144 to the second speed change unit 142 without passing through the first planetary gear device 134, and an indirect connecting path PA1$b$ through which rotation is transmitted from the input shaft 144 to the second speed change unit 142 via the carrier CA1 of the first planetary gear device 134. A path through which rotation is transmitted from the input shaft 144 to the second speed change unit 142 via the carrier CA1, pinion gears P1 mounted on the carrier CA1, and the ring gear R1 is referred to as a second intermediate output path PA2 through which rotation of the input shaft 144 is transmitted while its speed is changed (reduced), at a speed ratio (>1.0) larger than that of the first intermediate output paths PA1.

The second planetary gear device 138 includes a sun gear S2, pinion gears P2, carrier CA2 that supports the pinion gears P2 such that the gears P2 can rotate about themselves and about the axis of the gear device 138, and a ring gear R2 that engages with the sun gear S2 via the pinion gears P2. The third planetary gear device 140 includes a sun gear S3, two or more pairs of mutually meshing pinion gears P2, P3, carrier CA3 that supports the pinion gears P2, P3 such that the gears P2, P3 can rotate about themselves and about the axis of the gear device 140, and a ring gear R3 that engages with the sun gear S3 via the pinion gears P2, P3. The second planetary gear device 138 and the third planetary gear device 140 are partially coupled to each other, to thus provide four rotary elements RM1-RM4. More specifically, the sun gear S2 of the second planetary gear device 138 provides a first rotary element RM1, and the carrier CA2 of the second planetary gear device 138 and the carrier CA3 of the third planetary gear device 140 are integrally coupled to each other, to provide a second rotary element RM2. The ring gear R2 of the second planetary gear device 138 and the ring gear R3 of the third planetary gear device 140 are integrally coupled to each other, to provide a third rotary element RM3, and the sun gear S3 of the third planetary gear device 140 provides a fourth rotary element RM4. The second planetary gear device 138 and the third planetary gear device 140 form a Ravigneau type planetary gear train, in which the carriers CA2, CA3 are constructed by a common member, and the ring gears R2, R3 are constructed by a common member, while the pinion gears P2 of the second planetary gear device 138 also serve as second pinion gears of the third planetary gear device 140.

The first rotary element RM1 (sun gear S2) is selectively coupled to the case 132 via the first brake B1, so that its rotation is stopped, and is selectively coupled to the ring gear R1 of the first planetary gear device 134 as the intermediate output member (namely, couple to the second intermediate output path PA2), via the third clutch C3. Further, the first rotary element RM1 (sun gear S2) is selectively coupled to the carrier CA1 of the first planetary gear device 134 (namely, coupled to the indirect connecting path PA1*b* of the first intermediate output paths PA1), via the fourth clutch C4. The second rotary element RM2 (carriers CA2, CA3) is selectively coupled to the case 132 via the second brake B2, so that its rotation is stopped, and is selectively coupled to the input shaft 144 (namely, to the direct connecting path PA1*a* of the first intermediate output paths PA1), via the second clutch C2. The third rotary element RM3 (ring gears R2, R3) is coupled integrally to the output shaft 146, to deliver rotary power. The fourth rotary element RM4 (sun gear S3) is coupled to the ring gear R1 via the first clutch C1.

FIG. 13 is an operation table (engagement operation table) useful for explaining combinations of operating states of hydraulic engagement devices when a plurality of gear positions (speeds) are established in the automatic transmission 126. In FIG. 12, "○ (circle)" denotes engaged state, and blank space denotes released state. Thus, in the automatic transmission 126, the first clutch C1, second clutch C2, third clutch C3, and the fourth clutch C4 (which will be simply called "clutch C" when they are not particularly distinguished from each other), and the first brake B1 and the second brake B2 (which will be simply called "brake B" when they are not particularly distinguished from each other) are selectively engaged, so that the automatic transmission 126 is placed in a selected one of a plurality of gear positions, e.g., forward eight speeds, having different speed ratios γ. The different speed ratios of the respective gear positions are determined as appropriate, according to the respective gear ratios of the first planetary gear device 134, second planetary gear device 138, and the third planetary gear device 140.

In this embodiment, too, when it is determined that unauthorized access from the outside occurs, the gear position and the shift range can be fixed, for example, as indicated in the first embodiment, second embodiment, third embodiment, and the fourth embodiment, so that similar effects can be expected.

It is to be understood that the above embodiments are mere exemplary embodiments, and that the disclosure may be carried out with various changes or improvements added to the embodiments based on the knowledge of those skilled in the art.

What is claimed is:

1. A vehicle control system comprising:
   a drive power source;
   an automatic transmission;
   a shift range switching device configured to perform switching of shift ranges based on an operation signal of a shift operation device; and
   an electronic control unit configured to permit a vehicle to travel in an automated driving mode, the electronic control unit being configured to detect unauthorized access from an outside to an in-vehicle Local Area Network during the automated driving mode, the electronic control unit being configured to perform control to fix a gear position of the automatic transmission when the electronic control unit determines that the unauthorized access from the outside occurs during the automated driving mode.

2. The vehicle control system according to claim 1, wherein
   the electronic control unit is configured to perform control to fix the gear position to a gear position that has already been set at the time of detection of the unauthorized access.

3. The vehicle control system according to claim 1, wherein
   the electronic control unit is configured to perform control to fix the gear position to a higher-speed gear position than a gear position that has already been set at the time of detection of the unauthorized access.

4. The vehicle control system according to claim 3, wherein
   the electronic control unit is configured to perform control to reduce a rotational speed of the drive power source.

5. The vehicle control system according to claim 1, wherein:
   the drive power source includes an engine and a motor; and
   the electronic control unit is configured to restrict drive power of at least one of the engine and the motor.

6. The vehicle control system according to claim 1, wherein the electronic control unit is configured to perform control to fix a shift range as one of the shift ranges established by the shift range switching device, to a shift range that has already been set at the time of detection of the unauthorized access.

7. A control method of a vehicle control system,
the vehicle control system including a drive power source, an automatic transmission, a shift range switching device configured to perform switching of shift ranges based on an operation signal of a shift operation device, and an electronic control unit configured to permit a vehicle to travel in an automated driving mode,
the control method comprising:
detecting, by the electronic control unit, unauthorized access from an outside to an in-vehicle Local Area Network during the automated driving mode; and
performing, by the electronic control unit, control to fix a gear position of the automatic transmission when the electronic control unit determines that the unauthorized access from the outside occurs during the automated driving mode.

\* \* \* \* \*